Figure 1:
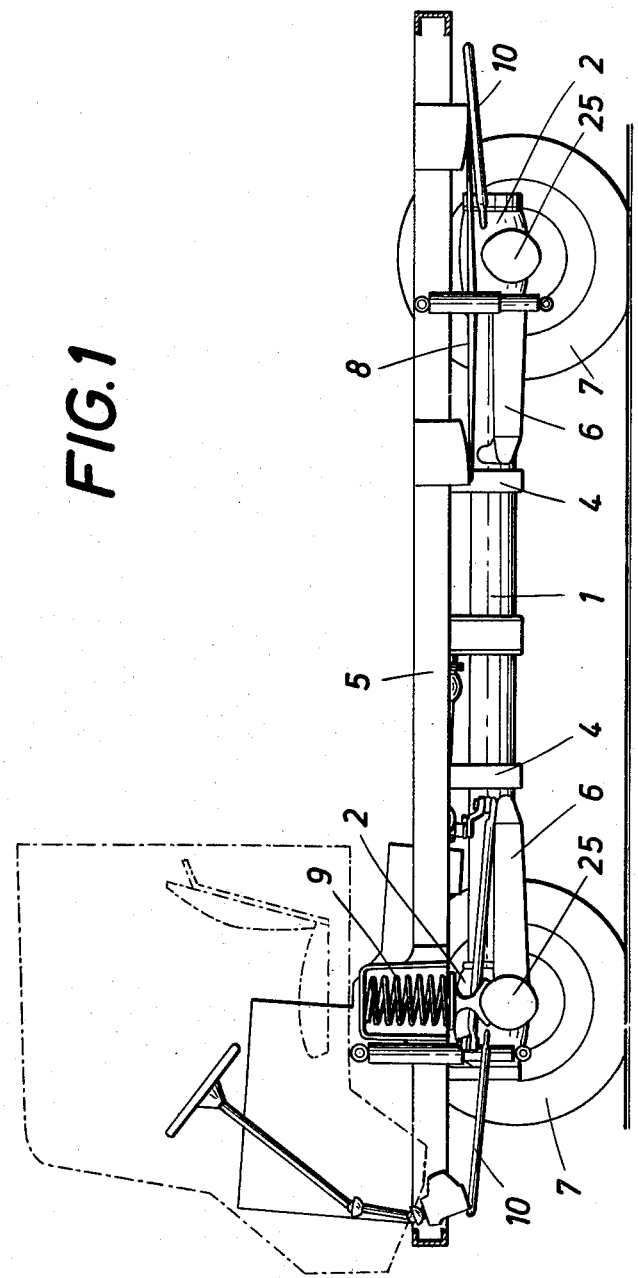

United States Patent [19]

Ledwinka et al.

[11] 4,313,518

[45] Feb. 2, 1982

[54] FRAME, POWER TRAIN AND WHEEL ASSEMBLY

[75] Inventors: Erich Ledwinka; Milan Cvetnic, both Graz, Austria

[73] Assignee: Steyr-Daimler-Puch Aktiengesellschaft, Vienna, Austria

[21] Appl. No.: 124,514

[22] Filed: Feb. 25, 1980

[30] Foreign Application Priority Data

Mar. 1, 1979 [AT] Austria .................. 1532/79

[51] Int. Cl.³ .................. B60K 17/30; B60G 3/14
[52] U.S. Cl. .................. 180/233; 180/70 P; 180/73 TL; 180/248; 280/663; 280/690; 74/710.5; 74/714
[58] Field of Search .................. 180/233, 244, 73 TL, 180/70 P, 76, 248, 249, 250, 256; 280/663, 690, 691; 74/665 H, 710.5, 714

[56] References Cited

U.S. PATENT DOCUMENTS

| | | | |
|---|---|---|---|
| 1,437,715 | 12/1922 | Bridge | 74/714 |
| 2,751,029 | 6/1956 | Dixon | 180/244 |
| 2,814,503 | 11/1957 | Porsche et al. | 180/256 |
| 3,603,422 | 9/1971 | Cordiano | 180/73 TL |
| 3,768,336 | 10/1973 | Wharton | 74/714 |

FOREIGN PATENT DOCUMENTS

| | | |
|---|---|---|
| 417166 | 4/1971 | Australia . |
| 136838 | 3/1933 | Austria . |
| 74501 | 12/1960 | France . |
| 271821 | 7/1927 | United Kingdom . |
| 272501 | 2/1928 | United Kingdom . |
| 434939 | 9/1935 | United Kingdom . |
| 444606 | 3/1936 | United Kingdom . |
| 457145 | 11/1936 | United Kingdom . |

Primary Examiner—Joseph F. Peters, Jr.
Assistant Examiner—Donn McGiehan
Attorney, Agent, or Firm—Kurt Kelman

[57] ABSTRACT

A centrally disposed, torsion-proof carrying tube contains a propeller shaft operatively connected to the driven axle assemblies and equipped with supports for the body of the vehicle. Each axle assembly has a spur gear differential associated therewith and comprises two bevel gear trains succeeding the differential and accommodated in a gear housing flanged to the central carrying tube. The body supports comprise at least two cross members joined to the carrying tube and two longitudinal members secured to the cross members. Each wheel is mounted on a stub axle carried by a longitudinal control arm pivoted to a cross member on an axis which is transverse to the longitudinal direction of the vehicle. Two universal-joint shafts drive the two wheels of each axle assembly. Each universal-joint shaft is associated with one of the bevel gear trains and is enclosed in a splash-proofing shell tube connected by ball-type joints to the adjacent stub axle and to the adjacent gear housing, respectively. Each shell tube is mounted at one end in an axially yieldable annular seal.

3 Claims, 5 Drawing Figures

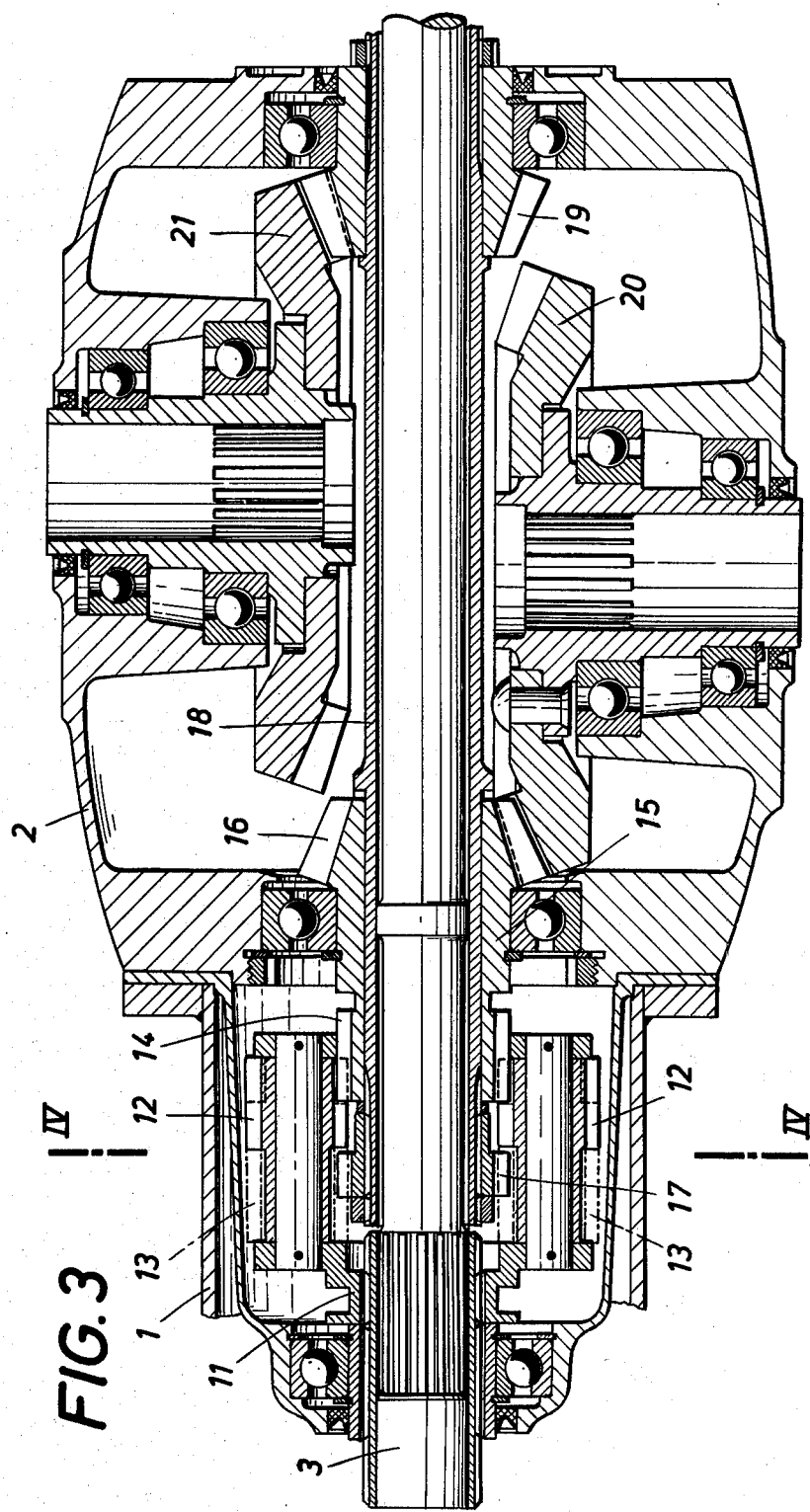

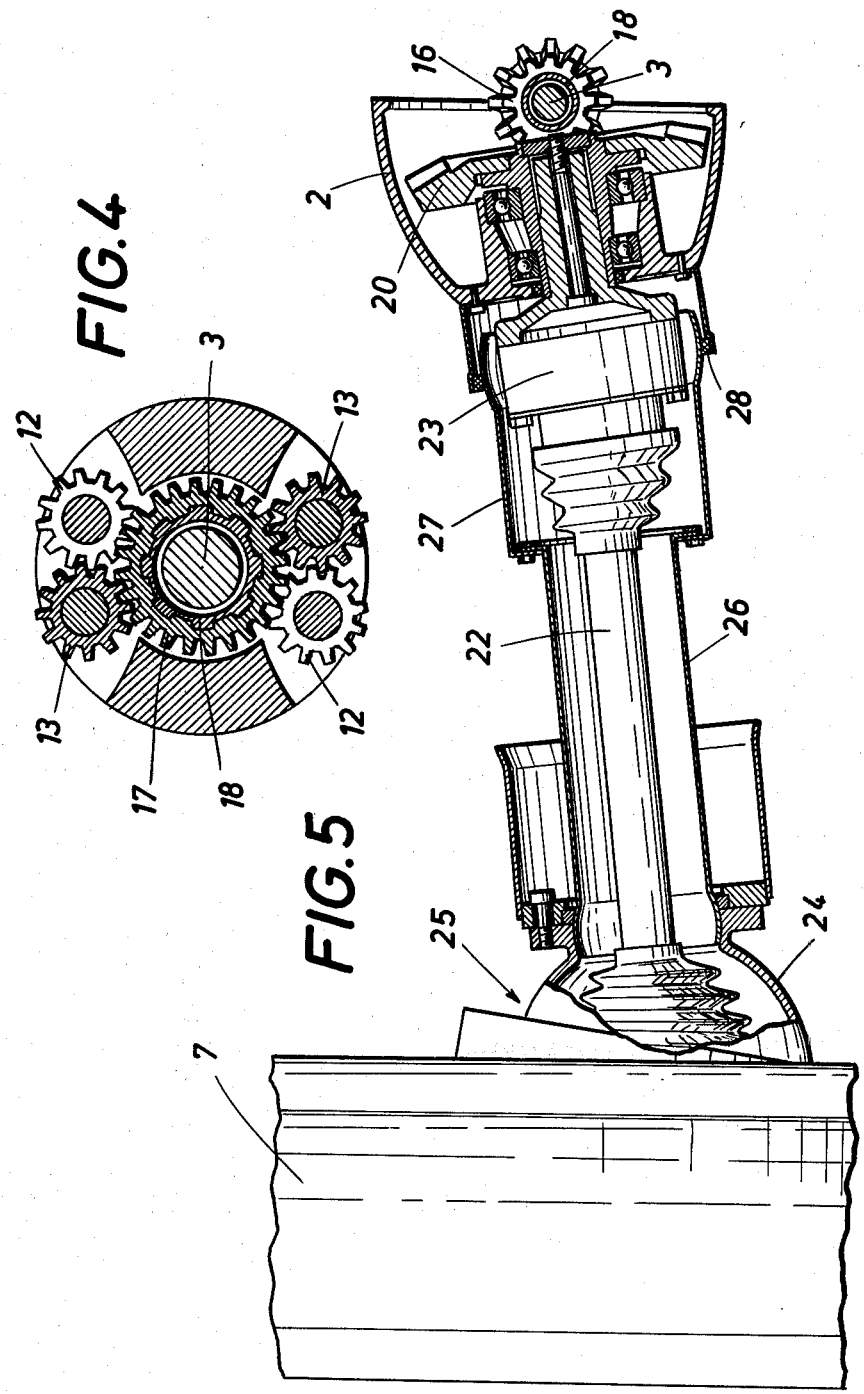

FRAME, POWER TRAIN AND WHEEL ASSEMBLY

This invention relates to a chassis, more particularly to a frame, power train and wheel assembly, which comprises a centrally disposed, torsion-proof carrying tube, which contains a propeller shaft operatively connected to driven axle assemblies and is provided with body supports for supporting the body of the vehicle, wherein each axle assembly has a differential associated with it and comprises two bevel gear trains, which succeed the differential and are accommodated in a gear housing that is flanged to the central carrying tube.

In known chassis of that kind, the body supports are mounted like brackets at specific portions of the central carrying tube. For this reason the body must match the body supports and it is not possible to use one and the same chassis for different bodies. As each axle assembly comprises two bevel gear trains, only one-half of the driving torque is transmitted by each bevel gear train to the associated axle section so that smaller crown wheels may be used and, as a result, the ground clearance is increased. The differential is disposed between the two crown wheels so that the latter must be spaced a relatively large distance apart. As a result, the bevel pinions must be relatively large in diameter, which involves an unfavorable transmission ratio so that either the crown wheels must be increased in size or output spur gear trains must be provided at the wheels if a suitable ground clearance is to be provided. Adding to the unsprung masses, the output spur gear trains result in poorer handling characteristics. The known chassis comprises swing axle sections comprising a stub axle in which the crown wheels of the bevel gear trains are mounted and which swing about the central propeller shaft. Such swing axle sections have the disadvantage that their swing movement will always change the wheel camber. This causes a premature wear of the tires. Besides, the control of the stub axle sections under high loads is not satisfactory.

It is an object of the invention so to improve the chassis or frame power train and wheel assembly described hereinbefore that it can be used with different bodies without need for alterations, it has a larger ground clearance without having output spur gear trains at the wheels and that it has good handling characteristics.

This object is accomplished according to the invention in that the body supports comprise at least two cross members, which are joined to the carrying tube, and two longitudinal members, which are secured to the cross members, each wheel is mounted on a longitudinal control arm, which is pivoted in known manner to one of the cross members on an axis which is transverse to the longitudinal direction of the vehicle, each longitudinal control arm is connected to a stub axle, on which one of the wheels is mounted, and, in known manner, two universal-joint shafts are provided for driving the two wheels of each axle assembly. The differential consists of a spur gear differential and each of the universal-joint shafts is associated with one of the bevel gear trains, which has a crown wheel mounted in the associated gear housing.

The longitudinal members may be used to support different bodies without need for an alteration of the frame and without an adverse stressing of the body. This is accomplished by the use of the central carrying tube which ensures that torsional stresses will be kept from the framework consisting of the longitudinal and cross members. The carrying tube and framework are lighter in total weight than a frame which consists only of longitudinal and cross members and has the same torsional strength. The longitudinal control arms pivoted to the cross members ensure a satisfactory control of the wheels and axle sections. The universal joints ensure that the wheels cannot assume different inclinations as the axle sections swing and that the track will not change. Because the bevel gear trains are preceded by a spur gear differential, the two crown wheels of the two bevel gear trains can be closely spaced apart so that the driving bevel pinions may be relatively small in diameter and ensure a favorable transmission ratio even when the crown wheels are small in diameter for a larger ground clearance. There is no need for output spur gear trains so that the structural expenditure is decreased and the unsprung masses are decreased too. Besides, the ground clearance can be increased in that the central portion of each axle section is downwardly and outwardly inclined in its initial position. This is ensured by the universal-joint shafts and permits of providing different ground clearances under different conditions. It will be understood that all axle assemblies are identical, in order to simplify the manufacture, and that two or more rear axle assemblies may be provided, as desired, without an alteration of the basic design.

The ground clearance will be further increased if the axis of each crown wheel includes a downwardly opening acute angle with the horizontal line which extends through the apices of the pitch cones of the crown wheels of each axle assembly.

According to a further feature of the invention, each universal-joint shaft is connected at opposite ends to the bevel gear housing and to the stub axle by ball-type joints and near one end is mounted in an axially yieldable annular seal. This shell tube will prevent a soiling of the universal joint shafts but will not hinder the swing and axial movements of the universal-joint shaft.

Within the scope of the invention the shell tube consists of two parts, which are connected by screws and can be pushed one into the other when the screws have been loosened, and the connection between the cross members and the central carrying tube can easily be eliminated because it is established by screws. As a result, the central carrying tube with the gear housings can be removed from the rest of the vehicle and when the two parts of a shell tube have been pushed one into the other one of the homokinetic joints of each universal-joint shaft can be removed so that the vehicle will remain on its wheels when the central carrying tube has been removed.

Figure 2:
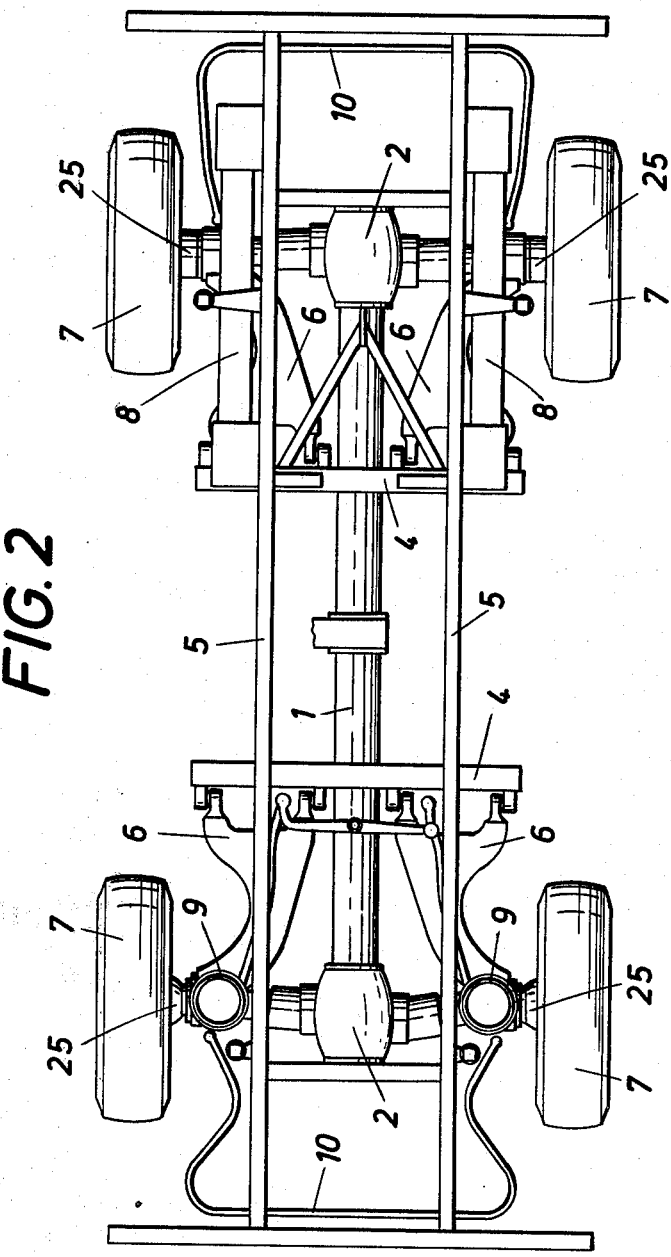

The subject matter of the invention is shown by way of example on the accompanying drawing, in which FIG. 1 is a side elevation showing a frame, power train and wheel assembly for all wheel-driven motor vehicles, FIG. 2 shows the assembly in side elevation, FIG. 3 is a longitudinal sectional view drawn to a larger scale and showing the two bevel gear trains of an axle assembly and the associated spur gear differential, FIG. 4 is a transverse sectional view taken on line IV—IV in FIG. 3 and FIG. 5 is a partly sectional view taken on a different scale and showing an axle section.

The frame, power train and wheel assembly according to the invention comprises a torsionally resistant central carrying tube 1 and two gear housings 2, which are flanged to the carrying tube 1 and associated with the front and rear axle assemblies. A propeller shaft 3 is operatively connected to the axle assemblies. Body supports comprise two cross members 4, which are secured to the central carrying tube 1, and two longitudinal members 5 secured to the cross members 4. Longitudinal control arms 6 are mounted on the cross members 4 and control respective ground wheels 7. The rear axle assembly is supported on the longitudinal members by leaf springs 8. The front axle assembly is provided with coil springs 9. Stabilizers for the respective axle assemblies are designated 10.

In accordance with FIG. 3, a spur gear differential comprises a slidable planet carrier 11, which is non-rotatably connected to the propeller shaft 3 by means of a sleeve. Each differential comprises two angularly spaced apart planet gears 12, 13, which mesh with each other and differ in tooth width. The gears 12 mesh with a gear 14 formed on the hollow hub 15 of one bevel pinion 16. The spur gears 13 mesh with a spur gear 17, which is non-rotatably connected to a hollow shaft 18, to which the second bevel pinion 19 is non-rotatably connected. If the planet carrier 11 is shifted to the right in FIG. 3, the spur gears 13 mesh with the gear 14 so that the planet gears 12 and 13 can no longer move relative to each other and the differential is blocked. The two bevel pinions 16, 19 mesh with the respective crown wheels 20, 21, from which power is transmitted to respective axle sections and wheels. Each axle assembly thus comprises two bevel gear trains 16, 20 and 19, 21 on opposite sides. The crown wheels 20, 21 are mounted in the bevel gear housing 2 on fixed axes. These two bevel gear trains are preceded by the spur gear differential.

It is apparent from FIG. 5 that universal-joint shafts 22 are provided for driving the two wheels of each axle assembly and each of said shafts comprises two homokinetic joints 23, 24. The axis of each crown wheel 20, 21 includes a downwardly opening acute angle with the horizontal line which extends through the apices of the pitch cones of the two crown wheels 20, 21. Each universal-joint shaft 22 is enclosed by a shell tube 26, 27, which is connected by ball-type joints to the stub axle 25 and to the bevel gear housing 2, respectively. The part 27 is mounted in a yieldable annular seal 28. The parts 26, 27 of the shell tube are connected by screws and may be pushed one into the other when said screws have been loosened. The homokinetic joint 23 can then be taken apart. When the screws connecting the cross members 4 and the central carrying tube 1 are subsequently loosened, the central carrying tube can be removed downwardly while the vehicle remains on its wheels 7.

What is claimed is:

1. A frame, power train and wheel assembly for an all-wheel drive motor vehicle, comprising a longitudinal carrying tube, a rotatable propeller shaft extending in said carrying tube along the same, body supports comprising two cross members spaced apart along and secured to said carrying tube, and two longitudinal members extending on opposite sides of and parallel to said carrying tube and secured to said cross members, two axle assemblies spaced apart along said carrying tube, and two spur gear differentials operatively connecting said propeller shaft to respective ones of said axle assemblies, each of said axle assemblies comprising a gear housing flanged to said carrying tube, first and second bevel pinions spaced apart along and rotatably mounted on a hollow tube in said gear housing and meshing with said differential, first and second crown wheels disposed on opposite sides of said hollow tube and rotatably mounted in said gear housing and in mesh with said first and second bevel pinions, respectively, two longitudinal control arms pivoted to one of said cross members on opposite sides of said carrying tube on a horizontal axis which is transverse to said carrying tube, two stub axles disposed on opposite sides of said hollow tube and connected to respective ones of said control arms, two road wheels rotatably mounted on respective ones of said stub axles, first and second universal-joint shafts, each of which is connected by respective universal joints to one of said crown wheels and one of said road wheels, a splash proofing shell tube enclosing each of said universal-joint shafts, ball-type joints connecting each of said shell tubes to the adjacent stub axle and to the adjacent gear housing, respectively, and an axially yieldable annular seal wherein each of said shell tubes is mounted.

2. A frame, power train and wheel assembly as set forth in claim 1, in which the apices of the pitch cones of the two crown wheels of each axle assembly lie on a horizontal line, and the axis of each crown wheel includes a downwardly opening acute angle with said horizontal line.

3. A frame, power train and wheel assembly as set forth in claim 1, in which said shell tube consists of two sections, which are connected by screws and adapted to be pushed one into the other when said screws have been loosened, and said cross members are detachably secured to said carrying tube.

* * * * *